(12) United States Patent
Kim

(10) Patent No.: US 9,851,880 B2
(45) Date of Patent: Dec. 26, 2017

(54) IMAGE ROTATION BASED ON TOUCH GESTURES

(71) Applicant: ADOBE SYSTEMS INCORPORATED, San Jose, CA (US)

(72) Inventor: Byungmoon Kim, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 347 days.

(21) Appl. No.: 14/211,454

(22) Filed: Mar. 14, 2014

(65) Prior Publication Data

US 2015/0261421 A1 Sep. 17, 2015

(51) Int. Cl.
*G06F 3/0488* (2013.01)
*G06F 3/0484* (2013.01)
*G06T 3/60* (2006.01)
*G06K 9/00* (2006.01)

(52) U.S. Cl.
CPC ...... *G06F 3/04845* (2013.01); *G06F 3/04883* (2013.01); *G06K 9/00355* (2013.01); *G06T 3/60* (2013.01)

(58) Field of Classification Search
None
See application file for complete search history.

(56) References Cited

U.S. PATENT DOCUMENTS

| 2009/0136136 A1* | 5/2009 | Mori | G06K 9/222 |
| | | | 382/187 |
| 2010/0045703 A1* | 2/2010 | Kornmann | G06F 1/1626 |
| | | | 345/653 |
| 2011/0102464 A1* | 5/2011 | Godavari | G06F 3/0416 |
| | | | 345/650 |
| 2012/0169670 A1* | 7/2012 | Kim | G06F 3/017 |
| | | | 345/175 |
| 2013/0229373 A1* | 9/2013 | Eriksson | G06F 1/1616 |
| | | | 345/173 |

* cited by examiner

*Primary Examiner* — Xiao Wu
*Assistant Examiner* — Steven Elbinger
(74) *Attorney, Agent, or Firm* — Shook, Hardy & Bacon, L.L.P.

(57) ABSTRACT

Embodiments of the present invention provide systems, methods, and computer storage media for facilitating rotation of images in response to gestures. A user can provide a gesture to effectuate a desired rotation of an image. In some implementations, a user might provide a rotation gesture (i.e., a circular pattern) to cause an in-plane image rotation or a stroke gesture (i.e., a straight line pattern) to cause an out-of-plane image rotation. Using intuitive gestures, such as touch gestures, the user can control the direction and axis of rotation as well as the amount of rotation, for example, to accomplish a desired rotation of an image.

16 Claims, 8 Drawing Sheets

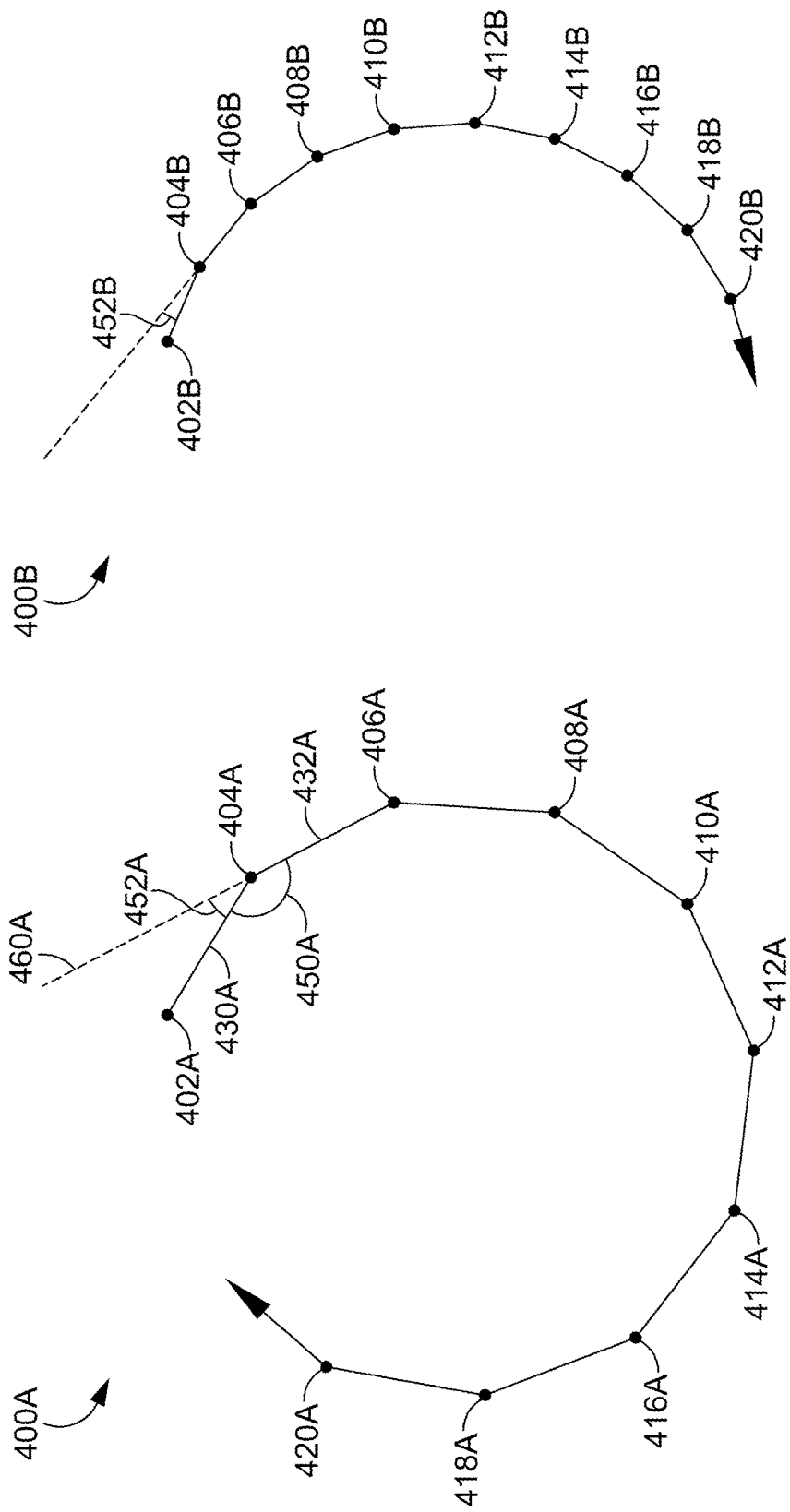

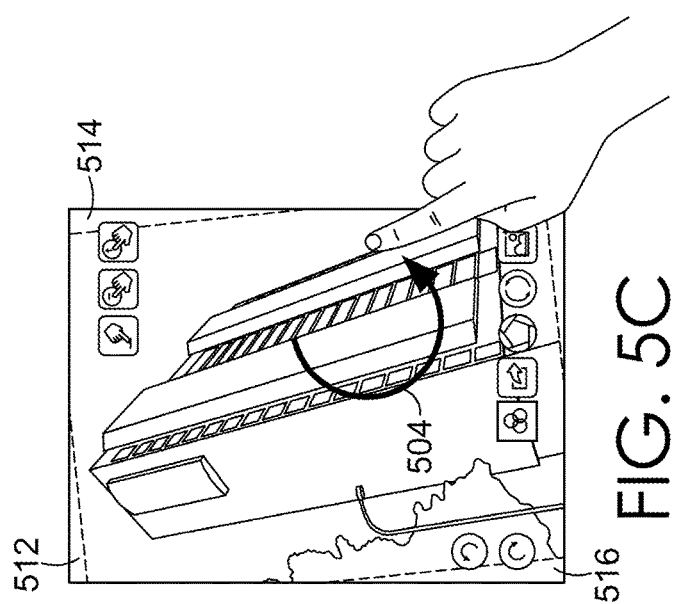
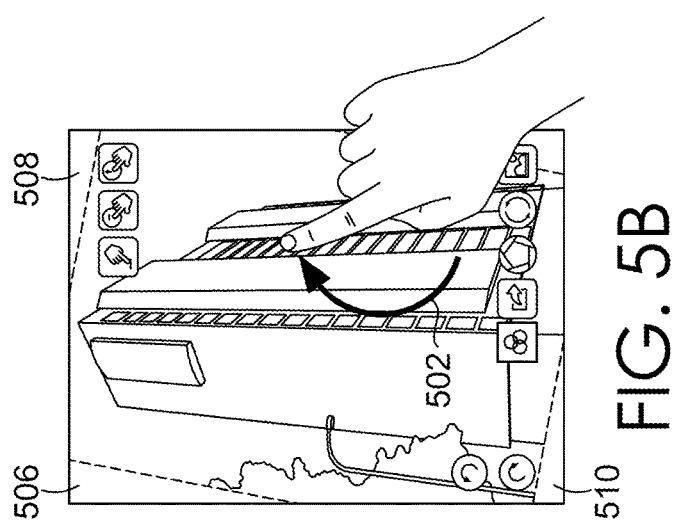
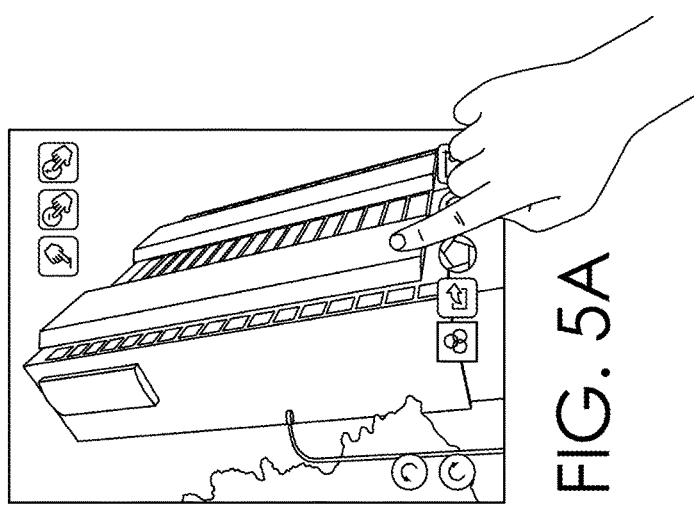
FIG. 5C
FIG. 5B
FIG. 5A

IMAGE ROTATION BASED ON TOUCH GESTURES

BACKGROUND

Oftentimes, images are not captured in an intended or desired orientation. In this regard, an image desired to have a horizontal or vertical orientation might be unintentionally offset from a horizontal or vertical axis. For example, based on an angle of a camera being used to capture an image, the captured image might be tilted or skewed in one direction or another. To generally assist in editing images, some image editing tools, such as the ADOBE PHOTOSHOP LIGHTROOM tool, have been developed that provide mechanisms to edit photographs. With such tools, many aspects of images can be edited in accordance with a user's preferences to attain images more desirable to the user.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to facilitating rotation of images based on a gesture provided by a user. In this way, a user can provide a gesture to effectuate a desired rotation of an image. In some implementations, a user might provide a rotation gesture (i.e., a circular pattern) to cause an in-plane image rotation or a stroke gesture (i.e., a straight line pattern) to cause an out-of-plane image rotation. Upon detecting a rotation gesture, the image can be rotated in-plane, or about a z-axis, for instance. By comparison, upon detecting a stroke gesture, the image can be rotated out-of-plane, for example, about an x-axis or a y-axis. As such, the user can control the direction and axis of rotation as well as the amount of rotation by using an intuitive gesture to accomplish a desired rotation, for example, to edit or view an image.

BRIEF DESCRIPTION OF THE DRAWINGS

The present invention is described in detail below with reference to the attached drawing figures, wherein:

FIGS. 4A-4B illustrate exemplary rotation gestures, in accordance with embodiments of the present invention;

FIGS. 5A-5C illustrate exemplary in-plane image rotations based on rotation gestures, in accordance with embodiments of the present invention;

DETAILED DESCRIPTION

Figure 1:
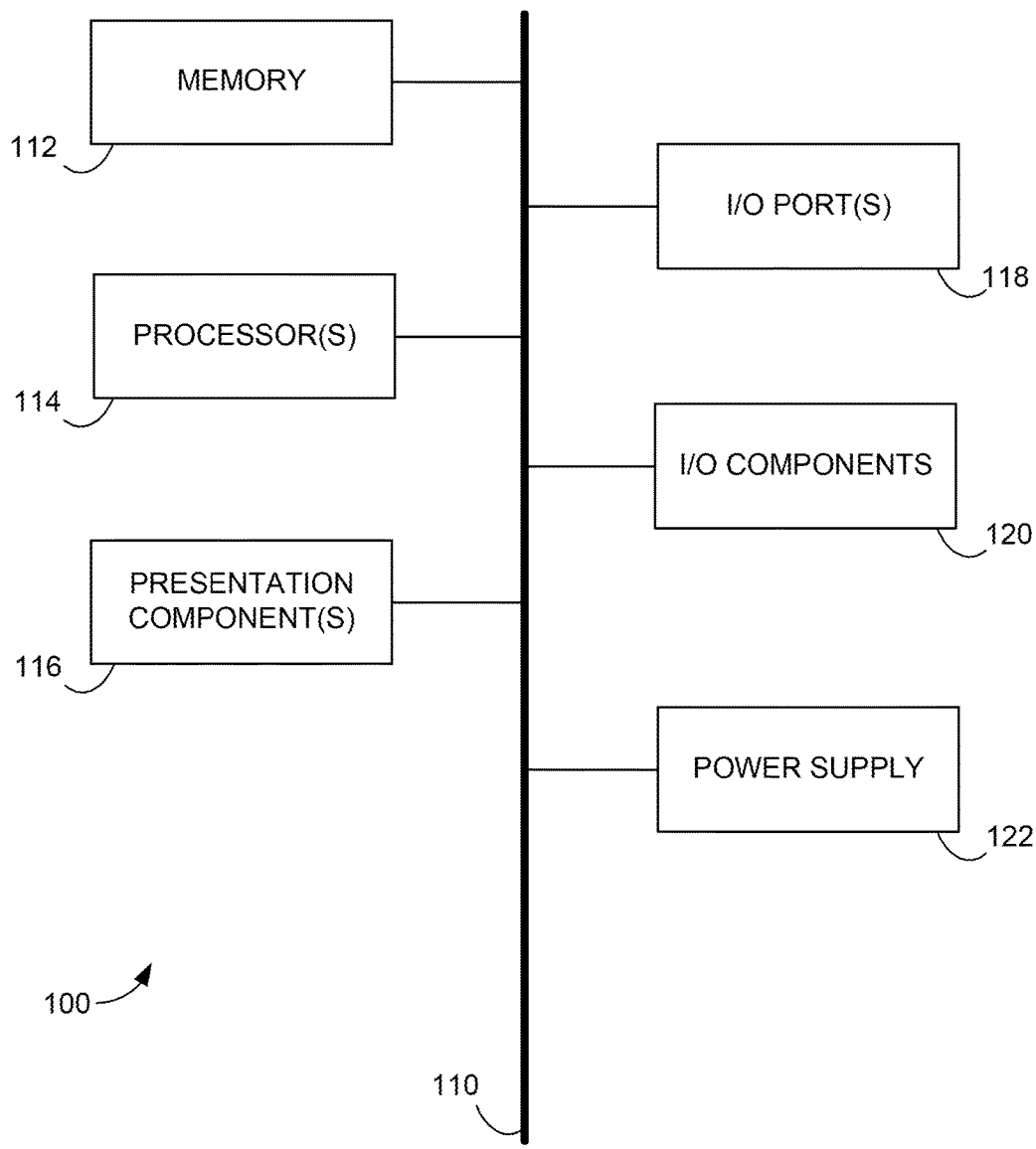
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Images are oftentimes not captured as intended or desired. To this end, based on an angle of a camera being used to capture an image, the captured image might not be aligned or oriented as desired by a user. As used herein, a user might refer to a photographer or another viewer of the image. For instance, in some cases, an image desired to have a horizontal or vertical orientation might be unintentionally offset from a horizontal or vertical axis, respectively. As another example, a user may wish to adjust an orientation at which the image was captured irrespective of an initial orientation of the image. In this regard, a user may wish to control the orientation of an image, for example, due to user preference, cropping of the image, or the like. To assist in the editing of images, some tools, such as the ADOBE PHOTOSHOP LIGHTROOM tool, have been developed that provide mechanisms to edit images. Such tools enable a user to edit many aspects of an image as desired by the user. As such, a user can edit images in accordance with the user's preferences to obtain images commensurate with the user's expectations or desires.

Embodiments of the present invention are directed to facilitating rotation of images based on a gesture. In this regard, a user can initiate rotation of an image by providing a gesture to rotate the image. As such, a user can easily and effectively orient an image to his or her liking. The user may control the direction and axis of rotation, as well as the amount of rotation, by using an intuitive touch gesture to accomplish a desired rotation, for instance, to edit or view an image. Although the description provided herein is generally directed to rotating an image, as can be appreciated, other types of data or content could similarly be rotated based on a gesture. As such, in addition to an image editing environment, image rotation may occur in any number of environments including any non-image editing environment.

To initiate rotation of an image, a user can provide a gesture to effectuate a desired rotation of the image. A gesture refers to a movement or action initiated by a user used to express an intention, instruction, or signal. A gesture may be a touch gesture or an air gesture. A touch gesture refers to a gesture indicated through a touch interface. As such, a touch gesture is detected through use of touch recognition technologies. As can be appreciated, a touch gesture can be a single touch gesture. That is, a single contact point of a finger is used to perform the touch gesture (as opposed to using two or more, for example, two fingers, to perform a gesture). An air gesture refers to a gesture indicated by a user made in space (e.g., movement of a user's finger in space). An air gesture can be detected through use of technologies that can recognize motion made in an environment (three-dimensional environment). Such technologies may include image capturing devices (e.g., video cameras, still image cameras, etc.), accelerometers, magnetometers, gyroscopes, etc.

A gesture can be of any type, pattern, or movement and is not intended to be limited in scope. Examples of gestures include, by way of example and not limitation, a point, a line, a shape (e.g., circle), a pattern, or the like. A rotation gesture, as used herein, refers to a gesture that indicates a rotation of motion or a circular motion. A stroke gesture, as used herein, refers to a gesture that indicates a line or straight line of motion. In some implementations, a user might provide one type of gesture (e.g., a rotation gesture) to cause an in-plane image rotation and another type of gesture (e.g., a stroke gesture) to cause an out-of-plane image rotation. Although the description provided herein is generally directed to a touch gesture, as can be appreciated, other types of gestures could be similarly used to rotate an image or other content. For example, an air gesture could be used to initiate rotation of an image.

Upon detecting a gesture, the image can be rotated in accordance with the detected gesture. For example, when a rotation gesture is detected, the image might be rotated in-plane, or about a z-axis. As another example, when a stroke gesture is detected, the image can be rotated out-of-plane, for instance, about a horizontal axis (e.g., an x-axis), a vertical axis (e.g., a y-axis), or any axis on xy-plane with any slope. As will be discussed in further detail below, an image rotation tool can be used to facilitate rotation of images based on gestures. The image rotation tool can perform such functionality in association with any type of gestures. Further, the rotating functionality described herein can be applied to any type of data or content including, for example, images, web content, text, photographs, documents, or the like.

Accordingly, in one aspect, an embodiment of the present invention is directed to one or more computer storage media storing computer-useable instructions that, when used by one or more computing devices, cause the one or more computing devices to perform operations. The operations include identifying a set of position indicators indicating contact locations associated with a gesture on a display screen of a user device. The operations also include determining steering angles associated with the set of position indicators, with each of the steering angles having a direction. The operations also include utilizing the directions of the steering angles to determine whether the gesture is in a pattern of a rotation or a line, wherein the gesture is determined to be in a pattern of a rotation when the steering angles correspond with a same direction, and the gesture is determined to be in a pattern of a line when the steering angles correspond with different directions.

In another embodiment of the invention, an aspect is directed to a method. The method includes, at a first instance, determining that a first gesture is provided by a user in a circular motion. In accordance with the circular motion, an in-plane rotation is applied to an image presented on a display screen. The method also includes, at a second instance, determining that a second gesture is provided by the user in a straight line motion. In accordance with the straight line motion, an out-of-plane rotation is applied to the image presented on the display screen.

A further embodiment is directed to a system that includes one or more processors; and one or more computer storage media storing computer-useable instructions that, when used by the one or more processors, cause the one or more processors to: determine a set of steering angles associated with a set of position indicators that indicate a point of contact during a gesture performed in a rotational manner; calculate an average steering angle from the set of steering angles; use the average steering angle to determine a rotation magnitude for rotating an image about an axis; and rotate the image about the axis in accordance with the determined rotation magnitude in the direction of the gesture.

Yet another embodiment is directed to one or more computer storage media storing computer-useable instructions that, when used by one or more computing devices, cause the one or more computing devices to perform operations. The operations include determining a rotation axis that is perpendicular to a slope of a stroke gesture in a form of a line provided by a user. The operations further include rotating an image about the rotation axis in response to the stroke gesture.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc. The I/O components 120 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 100. The computing device 100 may be equipped with depth cameras, such as stereoscopic camera systems, infrared camera systems, RGB camera systems, touchscreen technology, and combinations of these, for gesture detection and recognition. Additionally, the computing device 100 may be equipped with accelerometers or gyroscopes that enable detection of motion. The output of the accelerometers or gyroscopes may be provided to the display of the computing device 100 to render immersive augmented reality or virtual reality.

Figure 2:
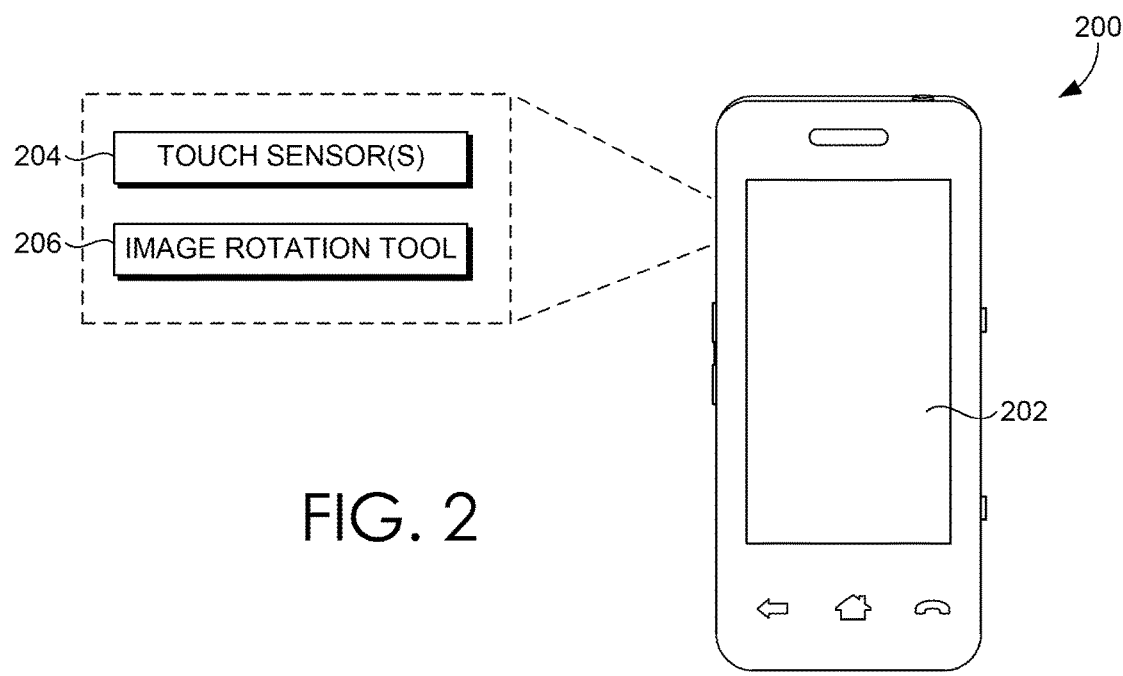
FIG. 2 is a block diagram of an exemplary computing system architecture in which embodiments of the invention may be employed.

In accordance with embodiments of the present invention, FIG. 2 illustrates an exemplary computing device 200 that is utilized to facilitate image rotation based on a touch gesture(s) provided by a user. The computing device 200 can be any device associated with a display screen 202, such as the computing device 100 of FIG. 1. The display screen 202 is a screen or monitor that can visually present, display, or output information, such as, for example, images, text, figures, values, symbols, videos, video clips, movies, photographs, lists, data sets, webpages, emails, text messages, notifications, or any other content. In embodiments, the computing device 200 is a portable or mobile device, such as a mobile phone, a personal digital assistant (PDA), a video player, a laptop, or any other portable device associated with a display screen. In some implementations, the computing device 200, such as a portable device, includes the display screen 202 (as illustrated in FIG. 2). That is, a display screen is integrated or coupled with the portable device. In other implementations, a display screen is remote from, but in communication with, the computing device.

The display screen 202 may be a touchscreen display, in accordance with embodiments described herein. A touchscreen display enables detection of location of touches or contact within a display area. In this regard, a touchscreen display refers to a display screen to which a user can provide input or interact therewith by making physical contact or near contact with the display screen. An illustrative example includes a user utilizing his or her finger to tap or move, or use some other form of touch action, to interact with a user device. Other items, such as a stylus, fingernail, etc., may be used to provide input to the device by way of touchscreen display. As such, a touchscreen display can be used as an input component irrespective of whether a keyboard or mouse is used as an input component for interacting with displayed content. Touchscreen displays can be implemented using any of a variety of touchscreen technologies. By way of example, and not limitation, a touchscreen display might be based on various touchscreen technologies such as resistive, surface-acoustic wave, capacitive, infrared, optical imaging, dispersive signal technology, acoustic pulse recognition, and other technologies known in the art.

As shown in FIG. 2, the exemplary computing device 200 includes a touch sensor(s) 204. A touch sensor(s) 204 may be any touch sensor(s) that detects contact or touch of an object with the touchscreen display 202 of the computing device 200. Such an object may be, for example, a user digit (e.g., a finger), a stylus, or another component that contacts a touchscreen display. A touch sensor(s) 204 may be any sensor suitable to detect an indication of touch, such as, for example, a capacitive sensor or a resistive sensor. As can be appreciated, any number of touch sensors may be utilized to detect contact with a touchscreen display.

In operation, a touch sensor detects contact of an object with at least a portion of a touchscreen display 202 of the computing device 200. A touch sensor may generate a signal based on contact with at least a portion of the touchscreen display 202 associated with the computing device 200. The signal generated by the touch sensor(s) may be communicated to the image rotation tool 206 such that the image rotation tool 206 can facilitate rotation of an image.

In one embodiment, the touch sensor(s) 204 may be calibrated to generate a signal or communicate the signal upon exceeding a certain threshold generally accepted as being representative of sufficient contact. For example, in an instance when a touch sensor(s) 204 measures a certain threshold temperature or conductivity, the touch sensor(s) 204 may generate a signal and communicate the signal to the image rotation tool 206. On the other hand, when the touch sensor(s) 204 does not measure the certain threshold temperature or conductivity, the touch sensor(s) 204 may fail to generate the signal or communicate the signal to the image rotation tool 206. The touch sensor(s) 204 may be configured to generate signals based on direct human touch or touch using another object (e.g., a stylus, etc.). As can be appreciated, the sensitivity of the touch sensor(s) 204 implemented into the device 200 can affect when contact is registered or detected.

As described, the touch sensor(s) 204 transmits signals to the image rotation tool 206 to indicate contact with the touchscreen display 202. The image rotation tool 206 is generally configured to facilitate rotation of images. As such, upon referencing signals indicating a touch event in connection with the touchscreen display 202, the image rotation tool 206 can utilize such data to identify a manner in which to rotate the image and, thereafter, initiate rotation of the image. In some cases, the image rotation tool 206 is part of an application that performs the image rotation. For example, the image rotation tool 206 might perform image rotation functionality within image processing or image editing software. In other cases, the image rotation tool 206 might be distinct from an application that performs the image rotation. In this regard, the image rotation tool 206 might identify a manner in which to rotate an image and, thereafter, communicate with an application that subsequently performs the image rotation. Irrespective of whether the image rotation tool 206 or another component performs the image rotation, a user of the computing device 200 can view the image rotation via the touchscreen display 202.

Figure 3:
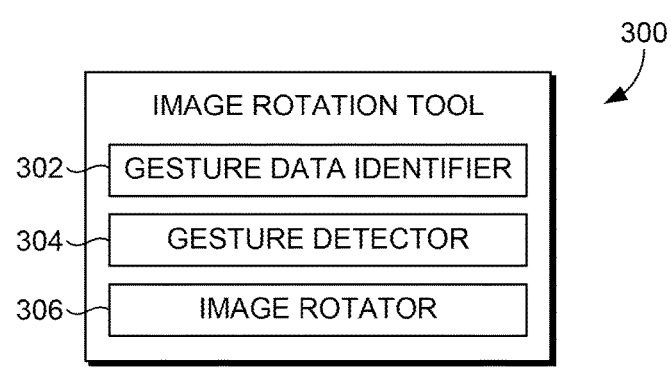
FIG. 3 is a block diagram of an exemplary image rotation tool for facilitating rotation of images based on touch gestures, in accordance with embodiments of the present invention.

Turning now to FIG. 3, a block diagram is provided illustrating an exemplary image rotation tool 300 in which some embodiments of the present invention may be employed. The image rotation tool 300 is generally configured to facilitate image rotation based on gestures. As shown in FIG. 3, the image rotation tool 300 includes a gesture data identifier 302, a gesture detector 304, and an image rotator 306. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The gesture data identifier 302 is configured to identify gesture data associated with a gesture. Gesture data refers to any data that indicates or describes a gesture, such as a touch gesture, provided by a user. Gesture data might include, for example, a position indicator, a direction indicator, a velocity indicator, an acceleration indicator, a magnitude indicator, a steering angle, a time component or time duration associated therewith, or the like. A position indicator refers to an indication of a position, location, or area of a gesture (e.g., contact with a touchscreen display). Accordingly, a position indicator might be a pixel(s) contacted, an x and/or y coordinate associated with a point(s) of contact (e.g., an x and/or y coordinate of a pixel that corresponds with a contacted area of a touch display screen), or the like. A direction indicator refers to a direction of a gesture, such as a rotation gesture or a stroke gesture. A velocity indicator refers to a velocity of a gesture. An acceleration indicator refers to an acceleration of a gesture. A magnitude indicator refers to a magnitude, distance, extent, displacement, or degree of a gesture.

A steering angle refers to an angle between position indicators associated with a gesture of a user. As can be appreciated, a steering angle might be an interior angle or an exterior angle. An interior angle is an angle formed by two sides of a polygon that share an endpoint. An exterior angle is an angle formed by one side of a polygon and a line extended from an adjacent side. As such, in some cases, to compute the steering angles, a line segment may be drawn or provided between position indicators to facilitate computation of the steering angle between the lines.

By way of example, and with reference to FIG. 4A, assume that gesture 400A is performed. In accordance with performance of gesture 400A, a first position indicator 402A, a second position indicator 404A, and a third position indicator 406A are identified resulting in a first line 430A between the first position indicator 402A and the second position indicator 404A and a second line 432A between the second position indicator 404A and the third position indicator 406A. An interior steering angle 450A is illustrated as the angle formed by two sides (i.e., lines 430A and 432A) of the polygon that share an endpoint (i.e., the second position indicator 404A). An exterior steering angle 452A is illustrated as the angle formed by one side 430A of the polygon and a line 460A extended from an adjacent side 432A.

Gesture data, such as position indicators, velocity indicators, acceleration indicators, or the like, can be associated with a time component. A time component can be any suitable component of time, such as, for example, a time or a time period. A lapse of a time period, such as one-tenth of a second (i.e., 0.1 second), may indicate a time at which to obtain gesture data. In this regard, each 0.1 second may correspond with a new position indicator and data associated therewith (e.g., a steering angle). Identifying or capturing position indicators to correspond with a time component might occur in any manner. For example, in some cases, sensors may coordinate detection of a touch position in accordance with a predetermined time component (e.g., every 0.1 seconds). As such, upon the lapse of each 0.1 second time duration, the sensor may detect a touch position. As another example, signals may be generated by a sensor(s) without reference to a time component while the gesture data identifier 302 correlates and captures touch positions corresponding with a specified time component.

In embodiments, gesture data might be raw data generated by one or more touch sensors, such as touch sensor(s) 204 associated with touchscreen display 202 of FIG. 2. In such embodiments, the gesture data identifier 302 might receive, retrieve, or access signals from one or more touch sensors indicating touch. Alternatively or additionally, gesture data may be derived, calculated, identified, or determined, for example, based on raw data generated by touch sensors. That is, signals generated from touch sensors may be processed to identify gesture data. By way of example only, signals received by the gesture data identifier 302 can be processed to determine x and/or y coordinates identifying locations that correspond with an area of a touchscreen display contacted by an object. Upon identifying position indicators, other types of gesture data, such as steering angles, can be determined. Any algorithm and/or lookup technique can be utilized to normalize, determine, calculate, identify, and/or derive various types of gesture data.

In embodiments, the gesture data identifier 302 can record and store gesture data. As can be appreciated, any amount of gesture data can be recorded or stored. Further, gesture data can be stored for any amount of time. For example, gesture data may be temporarily stored such that the data is disposed upon rotation of an image. As can be appreciated, in some implementations, the gesture data identifier 302 might be configured to perform calculations and determinations of gesture data, such as direction, velocity, steering angles, etc., associated with a gesture. In other cases, the gesture data identifier 302 might be configured to obtain some gesture data, such as position indicators, while other gesture data, such as velocity, steering angles, and/or direction, might be determined by another component, such as the gesture detector 304 or image rotator 306. Any component can be suitable for making such calculations and determinations, and embodiments of the present invention are not intended to be restricted to any particular component performing these calculations.

The gesture detector 304 is configured to detect gestures, such as touch gestures, initiated by users. As previously described, a gesture can take on any shape or pattern, such as, for example, a rotation or circular pattern, a stroke or straight line pattern, a polygonal shape, or the like. In some implementations, a type of gesture being performed might be selected from a predetermined set of gesture types. In this regard, the gesture detector 304 may determine whether a gesture aligns, matches, or corresponds with one of a particular set of gestures. In one embodiment, the gesture detector 304 determines whether a gesture is a rotation gesture or a stroke gesture.

The gesture detector 304 may utilize steering angles to detect a type of gesture. In some implementations, a set of steering angles associated with a set of position indicators can be used to detect a type of gesture. In this way, a sequence of steering angles corresponding with a set of positions indicators can be analyzed. As previously described, a position indicator refers to a position or location of a point of contact made during a gesture. A set of position indicators, or a position indicator set, refers to a set of sequential position indicators. In some cases, the set of position indicators is associated with a time component such that each position indicator is captured upon a lapse of a time interval (e.g., 0.01 second). A set or sequence of position indicators may include any number of position indicators, such as, for instance, a set of ten position indicators, a set of twenty position indicators, a set of fifty positions indicators, etc.

By way of example only, and with reference to FIG. 4A, assume that a set of ten position indicators 402A-420A are captured in connection with a user gesture, with each position indicator being captured upon a lapse of 0.01 second after capturing the previous position indicator. In such an example, steering angles, such as steering angle 450A or 452A, associated with position indicators 402A-420A are computed. As described above, line segments might be used between the position indicators to identify the steering angles between the line segments. For example, the interior steering angle 450A may be calculated between the line segment 430A and 432A. The sequence of steering angles associated with position indicators 402A-420A can then be used to identify or detect a gesture being input by a user.

In this regard, the gesture detector 304 may compare the steering angles to one another to detect a gesture. Various methods can be employed to determine the gesture type based on steering angles. For example, in one implementation, steering angles that are random, alternate, or otherwise inconsistent in direction may indicate a straight line or stroke gesture, particularly if the exterior steering angles are small. That is, because a line being drawn by a user is generally not completely straight and varies slightly from one direction to another, a line or stroke may be inferred as an intended gesture by the user. By contrast, steering angles that are constant or consistent in one direction may indicate a rotation gesture. As can be appreciated, in determining whether steering angles are consistent or a same direction, a direction threshold might be used. In this regard, a direction threshold might be used to determine whether steering angles are in the same direction or consistent. For instance, assume that ten steering angles are analyzed. Further assume that a direction threshold is 90%. In such a case, the steering angles are considered to be the same or consistent in direction if at least nine of the ten angles indicate a same direction or a rotation (e.g., in the positive direction).

Alternatively or additionally, magnitudes or degrees of steering angles may be used to determine a type of gesture. For instance, exterior steering angles larger in degree may tend to indicate a rotation gesture rather than a stroke gesture. By contrast, exterior steering angles smaller in degree may tend to indicate a stroke gesture. In some implementations, a gesture threshold value might be used to indicate a gesture type. For example, a steering angle greater than a threshold value might indicate a rotation gesture, while a steering angle less than a threshold value might indicate a stroke gesture.

The image rotator 306 is configured to initiate rotation of images based on detected gestures, such as touch gestures. By way of example, if a rotation gesture is detected, the image rotator 306 initiates an in-plane rotation of the image. If a stroke gesture is detected, the image rotator 306 may initiate an out-of-plane rotation of the image, for instance, toward or away from the user. As previously described, the image rotator 306 can perform the image rotation or can initiate the image rotation to be performed by another application.

In embodiments, the image rotator 306 utilizes gesture data, such as gesture data identified by the gesture data identifier 302, to determine a manner in which to rotate an image. Stated differently, gesture data is utilized to determine rotation attributes for use in rotating an image. A rotation attribute refers to any attribute or data associated with, describing, or indicating rotation to apply to an image. Rotation attributes might indicate, for instance, an axis for an image to rotate about (e.g., a x-axis, a y-axis, any line on xy-plane passing the origin, or a z-axis), a direction for image rotation (e.g., positive (+), negative (−), clockwise, counter-clockwise, etc.), an angular displacement or magnitude for image rotation (e.g., degrees, angles, radians, revolutions, etc.), an angular speed for image rotation (e.g., radians per time unit, degrees per time unit, etc.), an angular velocity for image rotation (e.g., angular speed for an image and the axis about which the image is to rotate, for instance, measured in degrees per time unit or radians per time unit), an angular acceleration for image rotation (e.g., rate of change of angular velocity, for instance, measured in radians per second squared or degrees per second squared), or the like. Rotation attributes might be measured or represented using any unit of measurement including, but not limited to, standardized measurements (e.g., International System of Unit) or other forms of measurement.

To determine one or more rotation attributes, gesture data associated with a set of position indicators might be analyzed. For example, steering angles, gesture direction, velocity, or the like corresponding with a set of position indicators associated with a touch (or air) gesture can be used to identify one or more rotation attributes to utilize in rotating the image. The set of position indicators analyzed might be any number of position indicators, such as ten position indicators, twenty position indicators, thirty position indicators, or the like. The position indicators set might include an indication of a current point of contact and prior points of contact separated by a time interval. For example, assume that a set of ten position indicators are used for determining a rotation attribute(s) to apply to an image at a particular instance. In such a case, a current position indicator and the nine prior position indicators might be used for determining a rotation attribute(s) to apply to an image at that time.

In operation, the image rotator 306 might determine various rotation attributes based on a type of gesture detected, for example, via the gesture detector 304. Although rotation attributes associated with a rotation gesture input by a user and a stroke gesture input by a user are described in more detail below, rotation attributes can be determined for any type of gesture. Embodiments of the present invention are not intended to be limited to determining a manner in which to rotate an image in accordance with such rotation and stroke gestures.

As previously described, a rotation gesture can indicate an intent to effectuate an in-plane image rotation. In this regard, in response to detecting a rotation gesture, an image is rotated in the plane of the display screen. By way of example, assume that an axis associated with a display screen includes an x-axis in the horizontal direction of the display screen and a y-axis in the vertical direction of the display screen. In such a case, the image is rotated in the xy-plane or about a z-axis (axis of rotation). The xy-plane of rotation is the plane orthogonal to the z-axis such that the z-axis is a surface normal of the xy-plane. Rotation in the xy-plane (plane of rotation) or about the z-axis, in this example, is referred to as an in-plane rotation. It is understood that use of an xy-plane as a plane of rotation is only exemplary and other configurations of planes and axes can be used to implement embodiments of the present invention.

Upon determining that a gesture is a rotation gesture, the image rotator 306 can determine a direction in which to rotate the image in-plane (e.g., in an xy-plane) or about an axis (e.g., a z-axis). In this way, the image rotator 306 can recognize whether to rotate the image clockwise or counter-clockwise, for instance, about a z-axis. A direction in which to rotate the image might be based on, for example, the direction in which the set of position indicators are sequentially directed or proceeding. Typically, a direction in which to rotate an image can correlate to a direction of the rotation gesture. For instance, assume that a rotation gesture is detected to occur in a clockwise direction. As such, the image rotation can also be determined to be in the clockwise direction. Although the image rotation might typically be determined to occur in the same direction as a rotation gesture, embodiments of the present invention are not intended to be limited thereto. For instance, in some implementations, it might be desired to rotate an image in the opposite direction as the detected gesture.

In addition to recognizing a direction in which to rotate an image, the image rotator 306 can also determine an extent or magnitude with which to rotate the image. To do so, the image rotator 306 may analyze steering angles associated with a touch gesture to determine a rotation magnitude for applying to the image. In some embodiments, steering angles associated with a set of position indicators might be analyzed to determine a rotation magnitude. For example, steering angles, such as exterior steering angles, associated with a set of ten position indicators might be analyzed to determine an extent with which to rotate the image. In one implementation, the steering angles can be averaged to avoid noise that might otherwise exist. By way of example, and with reference to FIG. 4A, steering angles associated with position indicators 402A-420A can be averaged to calculate an average steering angle associated with a set of position indicators. In some cases, a rotation magnitude might be equal to the average steering angle. In other cases, a rotation magnitude might be a product of the average steering angle multiplied by a constant factor, such as 0.02. Such a constant factor might be used, for example, to slow the rotation of the image.

As can be appreciated, as a gesture is performed at a faster speed, the image in turn can be rotated at a faster rate, such that the user can control the speed at which an image is rotated. By way of example only, and with reference to FIGS. 4A and 4B, gestures 400A and 400B occurring at different speeds are illustrated. Gesture 400A includes ten position indicators 402A-420A, and gesture 400B includes ten position indicators 402B-420B. For purposes of illustration, the gestures 400A and 400B are provided along a same pattern of rotation, but gesture 400A is moving at twice the speed as 400B. As such, in the same amount of time, gesture 400A nearly completes a circular rotation, while gesture 400B only completes approximately half of a circular rotation. As illustrated, the exterior steering angle 452A of gesture 400A is larger than the exterior steering angle of 452B of gesture 400B. As a result, while an image would be rotated about a same axis in the same direction (e.g., about a z-axis in the clockwise direction), the image would be rotated at a faster speed with respect to the gesture 400A than the speed of rotation responsive to gesture 400B. For instance, assume that exterior steering angle 452A is 30 degrees and that the average of the steering angles associated with position indicators 402A-420A equals 30 degrees. Further assume that the exterior steering angle 452B is 20 degrees and that the average of the steering angels associated with position indicators 402B-420B equals 20 degrees. Multiplying both steering angle averages by a constant factor of 0.02 equals 0.6 degrees and 0.4 degrees, respectively. As such, at a particular instant, the image is moved 0.6 degrees in response to the gesture 400A while an image being rotated in response to the gesture 400B would only rotate 0.4 degrees. As illustrated, the speed of the gesture 400A causes the image to be rotated at a greater magnitude per unit of time thereby increasing the speed of the image rotation.

FIGS. 5A-5C illustrate an exemplary embodiment of image rotation based on a rotation gesture. With initial reference to FIG. 5A, assume that an image being viewed is slightly tilted and that the user would like to rotate the image. Upon the user providing a rotation gesture that follows the rotation path 502 illustrated in FIG. 5B, the image is rotated in-plane in the clockwise direction of the rotation gesture. Now assume that a rotation gesture follows the rotation path 504 illustrated in FIG. 5C and, as such, the image is rotated in-plane in the counter-clockwise direction of the rotation gesture. As illustrated in FIGS. 5B and 5C, in accordance with rotating the image, a viewed portion within the display screen may be white or black space, as illustrated at 506, 508, 510, 512, 514, and 516, for example. As such, embodiments of the present invention may be configured to automatically crop the image to avoid display of any white or black space. Such an implementation might be performed automatically or based on a user preference. In an alternative embodiment, the white or black space may be shown such that the user can subsequently manually crop the image to his or her liking.

Returning to FIG. 3, as previously described, a stroke gesture can be detected when the gesture is generally in a straight line. A stroke gesture can indicate rotation of an image out-of-plane. In this regard, an image is rotated out-of-plane when it is rotated outside of a plane corresponding with the display screen. By way of example, assume that an axis associated with a display screen includes an x-axis in the horizontal direction of the display screen and a y-axis in the vertical direction of the display screen. In such a case, an out-of-plane image rotation occurs when the image is rotated in a direction that is not within the xy-plane. An out-of-plane rotation may occur, but is not limited to, when an image is rotated about an x-axis or a y-axis.

Upon determining that a gesture is a stroke gesture, the image rotator 306 can determine appropriate rotation attributes to utilize in rotating an image. As such, the image rotator 306 can identify a rotation axis about which to rotate the image. To do so, a slope associated with the stroke gesture can be determined. In this regard, a slope associated with a set of position indicators can be identified. As previously described, the set of position indicators can be any number of position indicators (e.g., ten position indicators). A slope can be calculated by finding the ratio of the vertical change to the horizontal change between two distinct points. In this regard, a total slope may be calculated based on a first point and a last point within the set of position indicators. In another embodiment, an average slope can be calculated from averaging the slopes between each of the consecutive position indicators within the set of position indicators. As can be appreciated, a horizontal line has a slope of zero, and the slope of a vertical line is undefined.

In some cases, an estimated or assumed slope associated with a set of position indicators may be determined. For example, an estimated slope may result when a calculated slope associated with a set of position indications is determined to be within a threshold of a predetermined slope. In this regard, assume that a stroke gesture is nearly horizontal in orientation having only a small or negligible slope. In such a case, the stroke gesture can be estimated or assumed to be a horizontal stroke having a slope of zero. Accordingly, a stroke gesture that appears to be a vertical line, a horizontal line, a diagonal line at 45 degrees, or the like can be regarded as such even if not precisely drawn in that manner.

Upon determining a slope, a rotation axis can be identified that is perpendicular to the slope associated with the stroke gesture. By way of example only, assume that a stroke gesture is a vertical line thereby having an undefined slope. In such a case, the rotation axis is perpendicular to the vertical axis and is, therefore, the horizontal axis (e.g., x-axis). As another example, assume that a stroke gesture is a horizontal line thereby having a slope value of zero. In such a case, the rotation axis is the vertical axis (e.g., y-axis) that is perpendicular to the horizontal axis. As yet another example, assume that a stroke gesture is 45 degrees from right top to left bottom of the display screen, the rotation axis for rotating the image can be determined to be a perpendicular axis in the other diagonal direction, that is, a 45 degree angle from the left top to the right bottom of the display screen.

The image rotator 306 may also determine a direction in which to rotate the image out-of-plane (e.g., in a non xy-plane). As such, the image rotator 306 recognizes whether to tilt the image forward or backward, for instance, about the x-axis or y-axis. In this way, the image rotator 306 recognizes whether to rotate the image clockwise or counterclockwise, for instance, about an x-axis. A rotation attribute indicating direction in which to rotate the image might be based on, for example, the direction in which the set of position indicators are proceeding. Typically, a direction in which to rotate an image can correlate to a direction of the stroke gesture. For instance, assume that a gesture is detected to occur in a vertical direction moving from the top of the display screen to the bottom of the display screen. As such, the image rotation can be determined to be in the clockwise direction about the x-axis, that is, with the top portion of the image moving towards the user. Although the image rotation might typically be determined to occur in the same direction as the gesture, embodiments of the present invention are not intended to be limited thereto. For instance, in some implementations it might be desired to rotate an image in the opposite direction as the detected gesture.

In addition to recognizing an axis and direction for rotating an image, the image rotator 306 can also determine an extent or magnitude with which to rotate the image. To do so, the image rotator 306 may analyze distance or velocity associated with a stroke gesture to determine a rotation magnitude for applying to the image. In some embodiments, distance or velocity associated with a set of position indicators might be analyzed to determine a rotation magnitude. For example, distance or velocity associated with a set of ten position indicators might be analyzed to determine an extent of which to rotate the image. In one implementation, a total distance or velocity associated with the set of position indicators may be calculated. In another implementation, an average of the distances or velocities associated with the set of position indicators may be calculated. A distance or velocity associated with the set of position indicators can be used to identify a rotation magnitude for applying to the image. In other cases, an identified rotation magnitude can be multiplied by a constant factor, such as 0.02. Such a constant factor might be used, for example, to determine an amount of image rotation that is most suited for the target device. A constant factor can be selected, for instance, based on experimentation with various constant factors and resulting image rotations. For example, assume that a straight line stroke of half screen length initially results in an image out-of-plane rotation by ten degrees. As another example, assume that a rotation gesture of 360 degrees initially yields an image in-plane rotation by ten degrees. In such cases, the constant can then be adjusted (e.g., by a developer or user) until the rotation seems most suitable. The actual constant used can be different for different devices, screen sizes, types of users, types of devices, or the like.

Figure 6C:
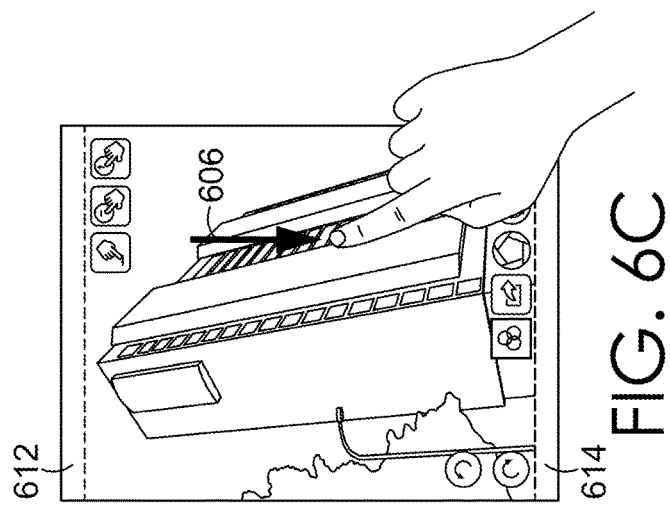
FIGS. 6A-6C illustrate exemplary out-of-plane image rotations based on stroke gestures, in accordance with embodiments of the present invention.
Figure 6B:
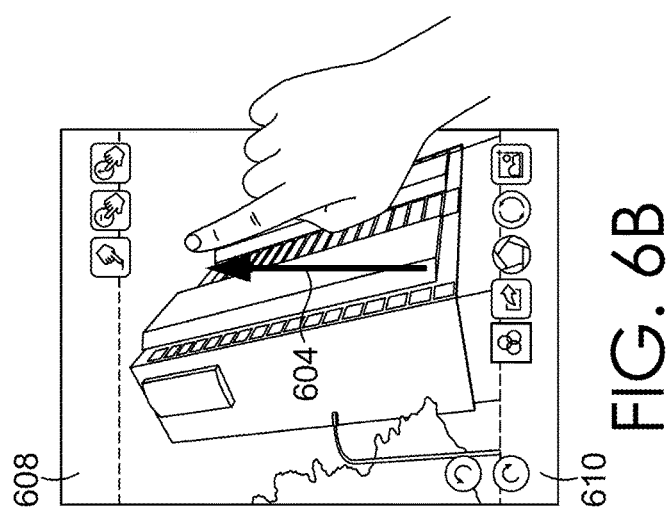
Figure 6A:
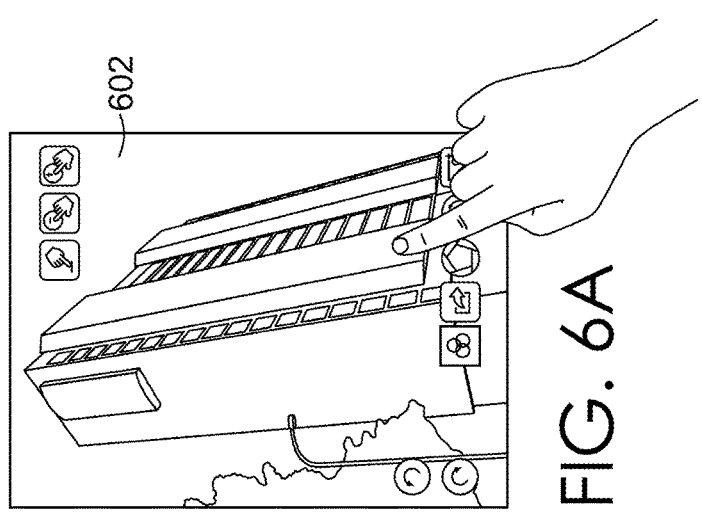

By way of example, and with reference to FIGS. 6A-6C, a stroke gesture is illustrated resulting in an out-of-plane image rotation. Initially, with respect to FIG. 6A, assume that an initial image 602 is captured. Now assume that a user provides an upward stroke gesture in the path illustrated by 604 of FIG. 6B. As shown in FIG. 6B, the image is rotated in the counter-clockwise direction about the horizontal axis (e.g., x-axis) in response to the upward stroke gesture. Now assume that the user provides a downward stroke gesture in the path illustrated by 606 of FIG. 6C. As illustrated, the image is rotated in the clockwise direction about the horizontal axis (e.g., x-axis) in response to the downward stroke gesture.

As illustrated in FIGS. 6B and 6C, in accordance with rotating the image, a viewed portion of a display screen may be white or black space, as illustrated at 608, 610, 612, and 614, for example. As such, embodiments of the present invention may be configured to automatically crop the image to avoid display of any white or black space. Such an implementation might be performed automatically or based on a user preference. In an alternative embodiment, the white or black space may be shown such that the user can subsequently manually crop the image to his or her liking.

Returning to the image rotator 306 of FIG. 3, the image rotator 306 can initiate rotation of the image in accordance with the determined rotation attributes, such as direction and rotation magnitude. Such a rotation of the image can be calculated and/or initiated at any time. For example, upon the lapse of a predetermined time component, rotation attributes to apply to an image can be calculated and implemented. By way of example only, assume that a time component of 0.01 second is used. In such a case, upon the expiration of a 0.01 second time duration, a rotation attribute(s) to apply to the image is calculated and applied such that the image is rotated each 0.01 second in accordance with the gesture provided by the user.

As can be appreciated, a set of position indicators utilized in determining rotation attributes evolves with the time. For example, assume that a time unit of 0.01 is used for identifying a new position indicator and for calculating a rotation attribute(s) for rotating the image. In such a case, upon the lapse of a 0.01 time period, a new position indicator is obtained and can be utilized in determining one or more rotation attributes for image rotation. As such, upon obtaining a new position indicator, the set of position indicators can be modified to include the new position indicator and exclude the earliest position indicator. Alternatively, the set of position indicators can be modified to include the new position indicator without removing any position indicators. The image can then be rotated in accordance with the new set of position indicators. As the image can be rotated in accordance with the time component (e.g., each 0.01 second at the time a new position indicator is captured), an angular velocity is effectively applied to the image rotation.

Figure 7:
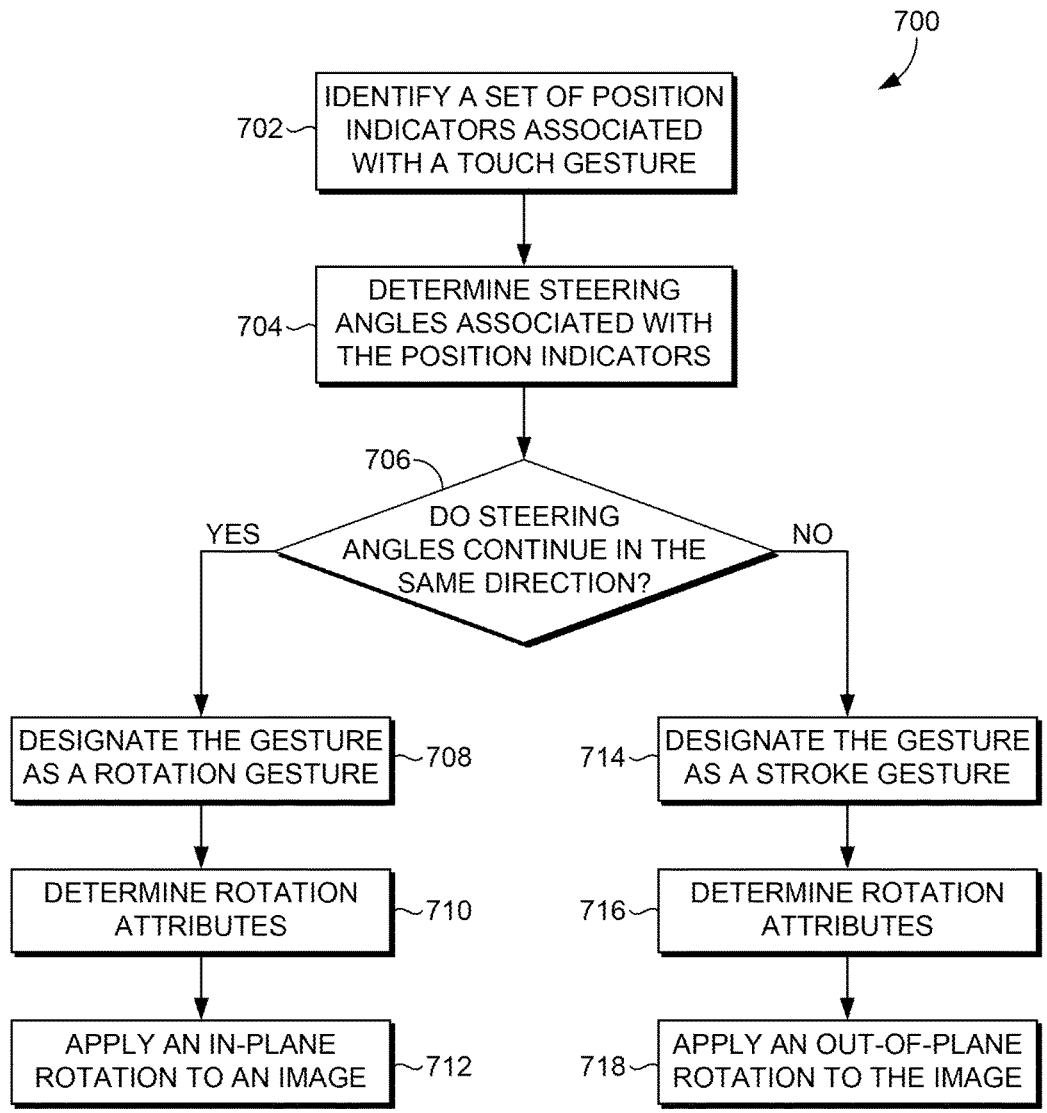
FIG. 7 is a flow diagram showing a method for facilitating image rotation based on a touch gesture according to various embodiments of the present invention.

Turning now to FIG. 7, a flow diagram is provided that illustrates a method 700 for facilitating image rotation based on a touch gesture, in accordance with embodiments of the present invention. Initially, as shown at block 702, a set of position indicators associated with a touch gesture is identified. Such position indicators indicate a position at which a touchscreen display is touched or contacted. As can be appreciated, in embodiments, the set of position indicators includes position indicators sequentially captured, with each position indicator being captured upon a lapse of a time component (e.g., a time duration of 0.03 seconds). At block 704, steering angles associated with the position indicators are determined. Steering angles may be identified using magnitudes and/or directions. In implementation, line segments between each of the position indicators may be used to determine the steering angles. The steering angles may be exterior angles or interior angles and may be measured in any number of units, such as degrees or radians, and/or directions.

At block 706, it is determined if the steering angles continue in the same direction. As can be appreciated, in determining whether the gesture is a rotation gesture or a stroke gesture, in some cases, the magnitude of the angles may additionally or alternatively be utilized to make such a determination. If the steering angles continue in the same direction, the gesture is designated as a rotation gesture, as indicated at block 708. Thereafter, at block 710, rotation attributes associated with the set of position indicators are determined to indicate an in-plane rotation to apply to an image. For example, a rotation direction and a rotation magnitude may be determined for applying to the image in the xy-plane. Thereafter, an in-plane rotation is applied to the image in accordance with the determined rotation attributes. This is indicated at block 712.

Returning to block 706, if, on the other hand, the steering angles do not continue in the same direction, the gesture is designated as a stroke gesture, as indicated at block 714. At block 716, rotation attributes associated with the set of position indicators are determined to indicate out-of-plane rotation to apply to an image. For instance, a rotation axis, a rotation direction, and a rotation magnitude may be determined for applying to the image. Subsequently, an out-of-plane rotation is applied to the image in accordance with the determined rotation attributes, as indicated at block 718.

Figure 8:
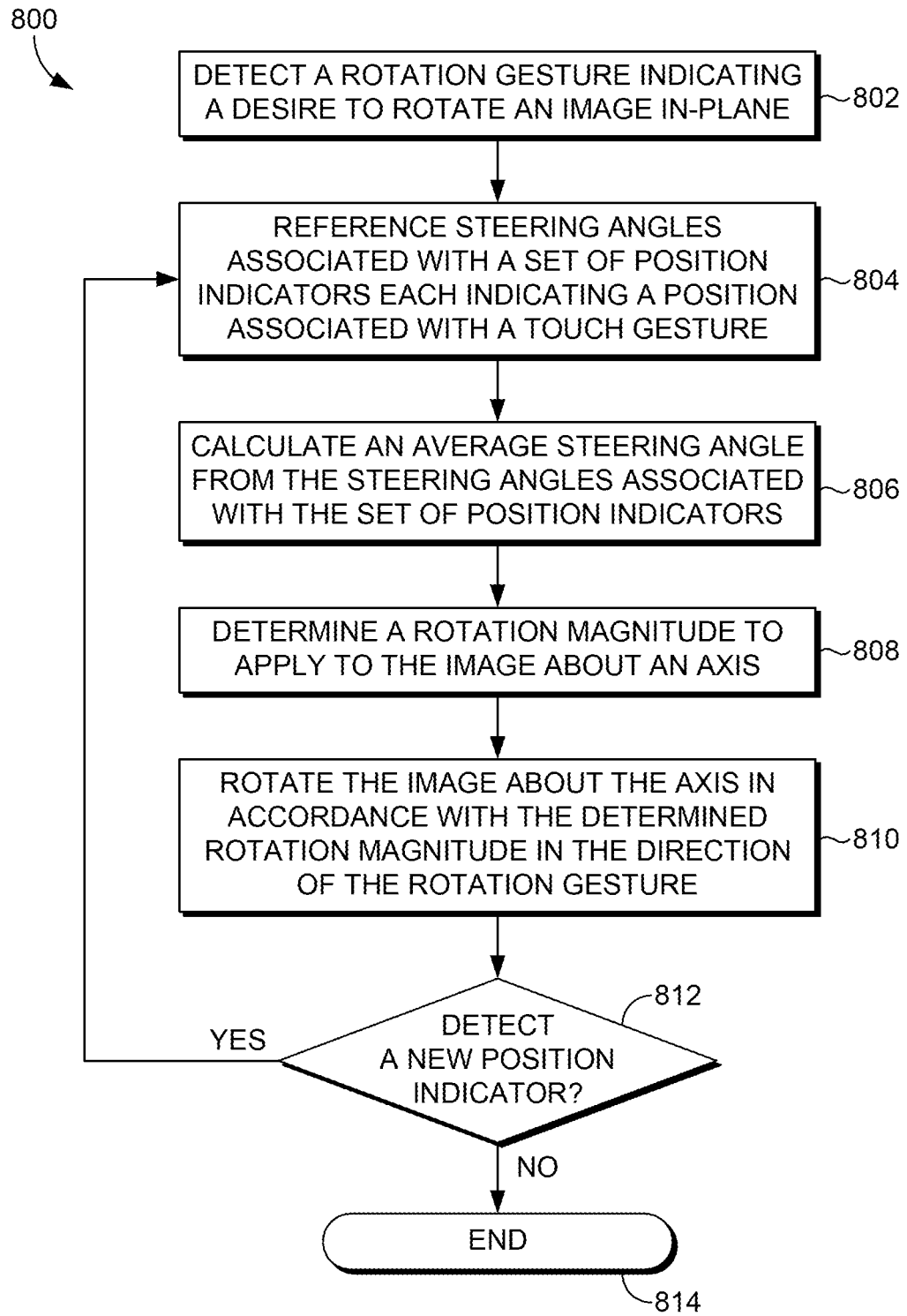
FIG. 8 is a flow diagram showing a method for determining rotation attributes in accordance with an in-plane image rotation according to one embodiment of the present invention.

Turning now to FIG. 8, a flow diagram is provided that illustrates a method 800 for determining rotation attributes in accordance with an in-plane rotation, according to embodiments provided herein. Initially, at block 802, a rotation gesture is detected. In some embodiments, a rotation gesture is detected when a user provides a rotational or circular touch motion via a touchscreen display. A rotation gesture can be detected in any manner, such as, for instance, utilizing steering angles associated with position indicators indicating touch positions of the gesture.

At block 804, steering angles associated with a set of position indicators each indicating a position associated with the rotation gesture are referenced. Steering angles may be identified using magnitudes and/or directions. In implementation, line segments between each of the position indicators may be used to determine the steering angles. The steering angles may be exterior angles or interior angles and may be measured in any number of units, such as degrees or radians, and/or directions. At block 806, an average steering angle is calculated from the steering angles associated with the set of position indicators. Such an average steering angle may be used to minimize noise related to a user's motion.

Subsequently, at block 808, a rotation magnitude is determined for applying to an image. In this regard, an extent of which to rotate an image can be determined. In some cases, a rotation magnitude might be equal to the average steering angle. In other cases, a rotation magnitude might be a product of the average steering angle multiplied by a constant factor, such as 0.02. Such a constant factor might be used, for example, to slow the rotation of the image such that a gesture representing one revolution does not result in the image being rotated 360 degrees. At block 810, the image is rotated about the axis in accordance with the determined rotation magnitude in the direction of the rotation gesture.

At block 812, it is determined if a new position indicator is detected. If a new position indicator is not detected, the method ends at block 814. If, however, a new position indicator is detected, the method returns to block 804 at which steering angles associated with a new set of position indicators are referenced and, thereafter, used to determine a magnitude at which to rotate the image. As can be appreciated, the new set of position indicators can include the addition of the new position indicator and exclude the earliest captured position indicator. In alternative embodiments, the new set of position indicators might be cumulative in that it includes the addition of the new position indicator but does not exclude any previous position indicators.

Figure 9:
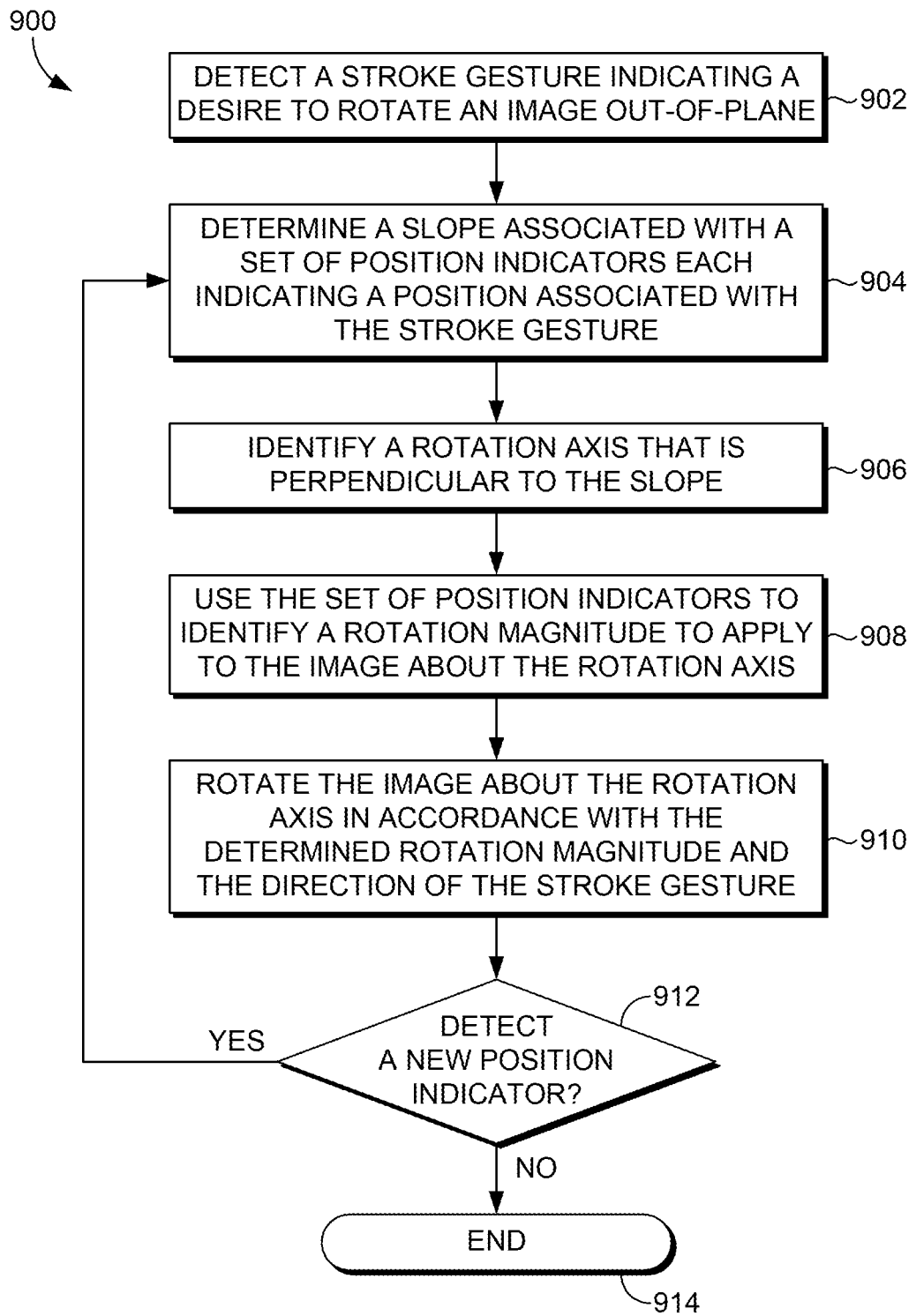
FIG. 9 is a flow diagram showing a method for determining rotation attributes in accordance with an out-of-plane rotation according to one embodiment of the present invention.

With reference now to FIG. 9, a flow diagram is provided that illustrates a method 900 for determining rotation attributes in accordance with an out-of-plane image rotation, according to embodiments provided herein. Initially, as indicated at block 902, a stroke gesture indicating a desire to rotate an image out-of-plane is detected. At block 904, a slope associated with a set of position indicators each indicating a position associated with the rotation gesture is determined. In some cases, a total slope based on, for instance, a first and last position indicator might be determined. In other cases, an average slope based on individual slopes between each of the consecutive position indicators might be calculated. At block 906, a rotation axis that is perpendicular to the determined slope is identified. At block 908, a rotation magnitude to apply to the image about the rotation axis is identified. In some embodiments, the rotation magnitude might be computed based on the total magnitude of movement associated with the set of position indicators (e.g., distance between the first and last position indicator). In other embodiments, the rotation magnitude might be computed based on the average magnitude of distances between each of the consecutive position indicators within the set of position indicators. In either case, a distance magnitude associated with the gesture might be converted to an angle of rotation to apply to the image. Subsequently, at block 910, the image is rotated about the rotation axis in accordance with the determined rotation magnitude and the direction of the stroke gesture. For example, a downward stroke gesture can result in clockwise rotation about the horizontal axis (e.g., x-axis), while an upward stroke gesture can result in a counter-clockwise rotation about the horizontal axis (e.g., x-axis). As another example, a horizontal stroke gesture moving from left to right can result in a counter-clockwise rotation about the vertical axis (e.g., y-axis), while a horizontal stroke gesture moving from right to left can result in a clockwise rotation about the vertical axis (e.g., y-axis).

At block 912, it is determined if a new position indicator is detected. If a new position indicator is not detected, the method ends at block 914. If, however, a new position indicator is detected, the method returns to block 904 at which a slope associated with a new set of position indicators is determined and, thereafter, used to determine a rotation axis for rotating the image. In an alternative embodiment, when a new position is detected, the method can return to block 908 at which a new rotation magnitude to apply to the image is identified. In such a case, the previously determined rotation axis can be deemed to apply throughout the detected stroke gesture such that the axis of rotation is constant during the stroke gesture. As can be appreciated, the new set of position indicators can include the addition of the new position indicator and exclude the earliest captured position indicator. In alternative embodiments, the new set of position indicators might be cumulative in that it includes the addition of the new position indicator but does not exclude any previous position indicators.

As can be understood, embodiments of the present invention provide for, among other things, facilitating image rotation based on a user gesture. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations comprising:
   identifying a set of position indicators indicating locations associated with a gesture;
   determining steering angles associated with the set of position indicators, each of the steering angles having a direction;
   utilizing the directions of the steering angles to determine whether the gesture is in a pattern of a rotation or a line, wherein the gesture is determined to be in a pattern of a rotation when the steering angles correspond with a same direction, and the gesture is determined to be in a pattern of a line when the steering angles correspond with different directions; and
   rotating an image based on the pattern of the gesture.

2. The one or more computer storage media of claim 1, wherein the steering angles comprise exterior angles.

3. The one or more computer storage media of claim 1, wherein the steering angles comprise interior angles.

4. The one or more computer storage media of claim 1, wherein the steering angles are determined using line segments between the position indicators.

5. The one or more computer storage media of claim 1, wherein an in-plane image rotation is applied when the pattern of the gesture is determined to be the rotation.

6. The one or more computer storage media of claim 1, wherein an out-of-plane image rotation is applied when the pattern of the gesture is determined to be the line.

7. A computer-implemented method comprising:
   determining steering angles associated with a set of position indicators, each position indicator indicating a point of contact during a gesture, a steering angle of the steering angles indicating an angle between two line segments connecting corresponding position indicators;
   at a first instance, determining a first gesture in a circular motion based on the steering angles corresponding with a same direction;
   in accordance with the circular motion, applying an in-plane rotation to an image presented on a display screen;
   at a second instance, determining a second gesture in a straight line motion based on steering angles associated with the second gesture, wherein the steering angles associated with the second gesture are inconsistent in direction; and
   in accordance with the straight line motion, applying an out-of-plane rotation to the image presented on the display screen.

8. The method of claim 7, wherein the first gesture and the second gesture are provided by a user on the display screen.

9. The method of claim 7, wherein the steering angles associated with the first gesture are consistent in direction.

10. The method of claim 7, wherein the in-plane rotation applied to the image is a rotation within a plane corresponding with the display screen.

11. The method of claim 7, wherein the out-of-plane rotation applied to the image is a rotation not within a plane corresponding with the display screen.

12. A system, comprising:
one or more processors; and
one or more computer storage media storing computer-useable instructions that, when used by the one or more processors, cause the one or more processors to:
determine steering angles associated with a set of position indicators, each position indicator indicating a point of contact during a gesture;
determine the gesture to be a rotation based on the steering angles corresponding with a same direction; and
determine the gesture to be a line based on the steering angles corresponding with different directions.

13. The system of claim 12, wherein the steering angles comprise exterior steering angles.

14. The system of claim 12, wherein the steering angles comprise interior steering angles.

15. The system of claim 12, the computer-useable instructions further cause the one or more processors to:
calculate an average steering angle from the steering angles in response to the gesture being the rotation;
use the average steering angle to determine a rotation magnitude for rotating an image about an axis; and
rotate the image about the axis in accordance with the determined rotation magnitude.

16. The system of claim 15, wherein the average steering angle is multiplied by a factor to determine the rotation magnitude for rotating the image about the axis.

* * * * *